(No Model.)
J. NOVOTNY.
GRAIN MEASURING, BAGGING, AND REGISTERING MACHINE.
No. 537,615. Patented Apr. 16, 1895.
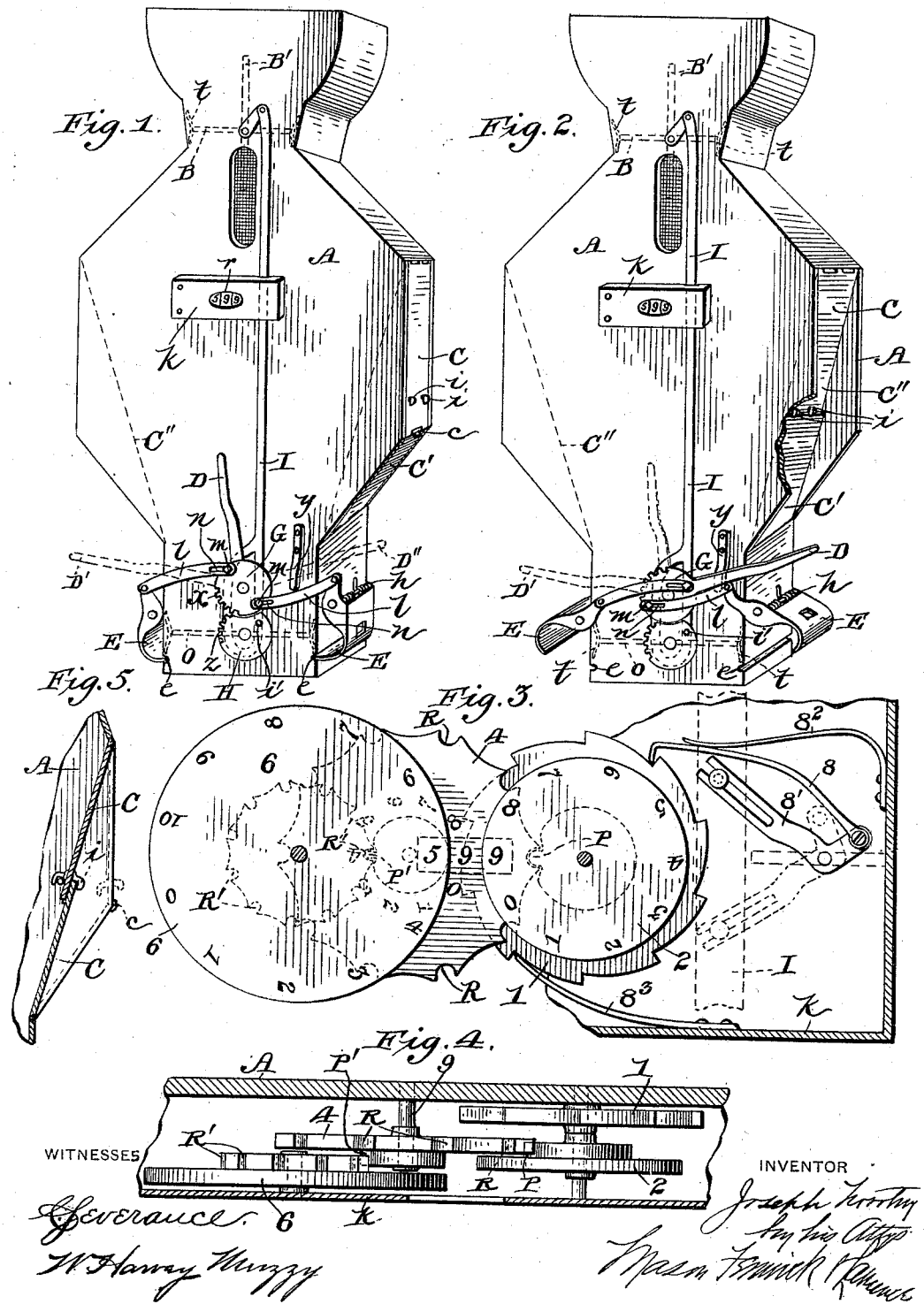

UNITED STATES PATENT OFFICE.

JOSEPH NOVOTNY, OF OSHKOSH, WISCONSIN.

GRAIN MEASURING, BAGGING, AND REGISTERING MACHINE.

SPECIFICATION forming part of Letters Patent No. 537,615, dated April 16, 1895.

Application filed November 1, 1894. Serial No. 527,671. (No model.)

*To all whom it may concern:*

Be it known that I, JOSEPH NOVOTNY, a citizen of the United States, residing at Oshkosh, in the county of Winnebago and State of Wisconsin, have invented certain new and useful Improvements in Machines for Measuring, Bagging, and Registering Grain; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a machine for measuring, bagging and tallying grain as it comes from a separator or any spout providing a flowage of grain.

In the accompanying drawings, Figure 1 is a perspective view of my invention showing the measuring box at its largest capacity; and Fig. 2 is a similar view, partly broken away and showing the method of decreasing the capacity. Fig. 3 is a face view, and Fig. 4 a top view, of my registering device; and Fig. 5 is a detail sectional view of the side doors.

Similar letters and numerals refer to similar parts in each view.

A is the measuring box and B the valve or gate admitting the grain to the box A from the spout, the dotted position B showing the valve closed and the dotted position B' showing it opened. A similar valve O is provided at the bottom of the box for the outlet of the grain, and both valves are operated at the same time, so that when the valve B is closed the valve O is opened and vice versa.

C C' are doors upon each side of the box for the purpose of lessening the capacity of the box when desired. By unlatching the latch $c$ the doors C C' may be pushed inwardly to the position C'' and secured in position by the turn buttons $i$ $i$, thus lessening the capacity of the box the required extent, so that the box may be arranged to measure two bushels, one bushel and three quarters, or one bushel and one half, according as either or both sides are arranged as stated.

D is a lever operating the wheel G which is provided with cogs $x$ to engage the cogs $z$ and operate the wheel H when the lever D is moved to the position D', but does not operate the wheel H when the lever D is thrown to the position D''. When the lever is in this latter position it then only opens the spring clamps E E which detain the bag by pressing it into the grooves $e$ $e$, the wheel G being connected with the clamps by means of the bars $l$ $l$. When the lever D is thrown to the position D' the pins $m$ $m$ slide in the grooves $n$ $n$ so as not to operate the clamps, but only the wheel H which latter is operated by the wheel G. The wheel H operates the valve O and the rod I pivoted at $i'$, which operates the tally box $k$ and the valve B at the same time.

$t$ $t$ $t$ $t$ are springs which the valves J and O close against to prevent clogging.

The rod I is pivoted at its lower end to the wheel H which has a segmental toothed gear, which wheel is secured to the journal of the lower valve, and the upper end of the rod is pivotally connected to a link, which latter is attached to the journal of the upper valve. The rod I has attached to it, in a sliding manner, a pivoted pawl 8, which pawl is provided with a slotted arm 8' and is held in an operative position by a spring $8^2$. A spring $8^3$ is secured to the tally box $k$ and interlocks with the teeth of the ratchet wheel 1.

When the lever D is turned down toward the left, it revolves the wheels G and H which causes the rod I to be raised and closes the upper valve and opens the lower valve. This movement also causes the pivoted pawl 8, which is attached to the said rod by the slotted arm 8', to move over the top of the ratchet wheel and enter another tooth. When the lever D is brought back to a vertical position, from that D', the rod I by this movement, is forced upward and the upper valve opened and the lower valve closed, and at the same time, the pawl 8 is drawn backward and revolves the ratchet wheel 1, one notch. There are ten ratchet teeth upon the wheel 1 and it is upon the same shaft as the units wheel 2 and revolves therewith. When the units wheel 2 revolves once around, the projection P upon said wheel meshes into one of the depressions R on the tens wheel No. 4, revolving it one tenth; and when the tens wheel revolves once around, the projection P' upon the tens wheel meshes into one of the depressions R' in the hundreds wheel revolving that one tenth. Upon the face of each wheel are printed numerals 0 to 9 inclusive (except the hundreds wheel which may have more) and these numerals are shown through a small opening r in the face of the tally box to indicate the number of bushels; the drawings for example showing five hundred and ninety-nine bushels. The tens wheel 4 is arranged upon a sliding shaft 9 so that it may be pushed inwardly to disengage it from the wheels 3 and 6 and allow the machine to be reset.

To operate the machine, the box being full of grain and the valve B open, the lever D is pulled to the position D'' which raises the bag clamps E, E. The end of the bag is then placed over the spout and the lever is released, the springs h, h, forcing the clamps down to engage and hold the bag. The lever D is then drawn to the position D', thereby opening the lower valve O and closing the upper valve B and operating the tally box K at the same time. When the containing case is emptied and the bag filled, the lever D is reversed to the position D'', and is retained there by the spring Y. The valve O is next closed and the valve B opened and the clamps E, E, raised to release the bag, and adapt them for receiving another bag.

Therefore, what I claim to have invented, and desire to secure by Letters Patent, is—

1. In a grain bagging machine, the combination of a containing case, an upper inlet valve, a lower outlet valve, bag clamps, a wheel secured to the lower valve and having a segmental gear, a rod connected to said wheel and the upper valve, another wheel having a segmental gear, rods connecting the bag clamps with said latter wheel, and a lever for operating the valve and clamps independently, substantially as described.

2. In a grain bagging machine, the combination of a box A, doors C, C' capable of being depressed to lessen the capacity of the box, an upper inlet valve, a lower outlet valve, bag clamps, a wheel secured to the lower valve and having a segmental gear, a rod connected to said wheel and the upper valve, another wheel having a segmental gear, rods connecting the bag clamps with said latter wheel, and a lever for operating the valves and clamps independently, substantially as described.

3. In a grain bagging machine, the combination of a box an outer containing case having one or both of its sides compressible to lessen the capacity of the box, an upper inlet valve, a lower outlet valve, a registering device adapted to be operated by the movement of the valves, bag clamps, a wheel secured to the lower valve and having a segmental gear, a rod connected to said wheel and the upper valve, another wheel having a segmental gear, rods connecting the bag clamps with said latter wheel, and a lever for operating the valve and clamps independently, substantially as described.

4. In a bagging machine, the combination of bag retaining clamps, valves, a tally box consisting of an inclosing casing a pawl and ratchet wheel revolving a units wheel and provided with a projection which at each revolution meshes into a corresponding depression upon a tens wheel to revolve it one tenth and the tens wheel provided with a projection which at each revolution meshes into a corresponding depression upon a hundreds wheel to revolve it a certain distance corresponding with the numerals thereon, a hundreds wheel and numerals upon each wheel which display in an opening in the face of the tally box to indicate the number of bags filled, the tens wheel being arranged upon a sliding shaft, means for operating the valves and tally box by one movement and the clamps by an opposite movement, substantially as described.

5. In a grain bagging machine, the combination of a containing case, an upper inlet valve, a lower outlet valve, bag clamps, and means connecting the valves and the bag clamps, the construction and operation being such that upon one manipulation of said means the valves will be operated simultaneously and upon another manipulation of said means the bag clamps alone will be operated, substantially as described.

6. In a grain bagging machine the combination of a containing case, an upper inlet valve, a lower outlet valve, spring operated bag clamps, a rod I connected by one of its ends to the upper valve and secured at its lower end to a wheel H having a segmental gear, a wheel G having a segmental gear which is adapted to be brought into mesh with the gear on the wheel H, a lever D connected to said wheel G, and arms also connected to the wheel G and carrying bag clamps, substantially as described.

In testimony whereof I affix my signature in presence of two witnesses.

JOSEPH NOVOTNY.

Witnesses:
H. A. HENKEL,
F. W. FOLLETT.